United States Patent
Gao et al.

(10) Patent No.: US 9,613,759 B2
(45) Date of Patent: Apr. 4, 2017

(54) METHOD FOR PREPARING FLUORINE/NITROGEN CO-DOPED GRAPHITIZED CARBON MICROSPHERES WITH HIGH VOLUMETRIC SPECIFIC CAPACITANCE

(71) Applicant: Yanshan University, Qinhuangdao (CN)

(72) Inventors: Faming Gao, Qinhuangdao (CN); Junshuang Zhou, Qinhuangdao (CN); Junchuan Zhang, Qinhuangdao (CN); Zhichao Li, Qinhuangdao (CN); Li Hou, Qinhuangdao (CN)

(73) Assignee: Yanshan University, Qinhuangdao, Hebei (CN)

( * ) Notice: Subject to any disclaimer, the term of this patent is extended or adjusted under 35 U.S.C. 154(b) by 113 days.

(21) Appl. No.: 14/672,454

(22) Filed: Mar. 30, 2015

(65) Prior Publication Data

US 2015/0364265 A1    Dec. 17, 2015

(30) Foreign Application Priority Data

Jun. 12, 2014  (CN) .......................... 2014 1 0260255

(51) Int. Cl.
  *H01G 11/42*   (2013.01)
  *H01G 11/34*   (2013.01)
  *H01G 11/44*   (2013.01)
  *C01B 31/04*   (2006.01)

(52) U.S. Cl.
  CPC ............. *H01G 11/34* (2013.01); *C01B 31/04* (2013.01); *H01G 11/42* (2013.01); *H01G 11/44* (2013.01); *C01P 2004/32* (2013.01); *C01P 2004/61* (2013.01); *Y02E 60/13* (2013.01)

(58) Field of Classification Search
  CPC .................................. C01B 31/04; H01G 11/42
  See application file for complete search history.

(56) References Cited

FOREIGN PATENT DOCUMENTS

| CN | 103183330 A | * | 7/2013 |
|---|---|---|---|
| CN | 103183341 A | * | 7/2013 |

OTHER PUBLICATIONS

English abstract of CN 103183341 (2013).*
English abstract of CN 103183330 (2013).*
Qiu-Feng Lv, et al., Fabrication of nitrogen-containing hollow carbon nanospheres by pyrolysis of self-assembled poly(aniline-co-pyrrole), Journal of Analytical and Applied.
Y.M.Yu, et al., High Active Hollow Nitrogen-Doped Carbon Microspheres for Oxygen Reduction in Alkaline Media, Fuel Cells Dec. 2012, No. 3, 506-510.

* cited by examiner

*Primary Examiner* — Peter F Godenschwager
(74) *Attorney, Agent, or Firm* — Yunling Ren (57) ABSTRACT

The present invention provides a method for preparing fluorine/nitrogen co-doped graphitized carbon microspheres with high volumetric specific capacitance, which is a simple process with moderate reaction conditions, high reproducibility, and low costs. The fluorine/nitrogen co-doped graphitized carbon microspheres prepared according to the present invention have a very high density, exhibit good electrochemical properties in an alkaline environment, as well as very high volumetric specific capacitance and good cyclic stability, and is of great importance in improving the properties of the electrode material for a capacitor.

4 Claims, 8 Drawing Sheets

METHOD FOR PREPARING FLUORINE/NITROGEN CO-DOPED GRAPHITIZED CARBON MICROSPHERES WITH HIGH VOLUMETRIC SPECIFIC CAPACITANCE

CROSS-REFERENCE TO RELATED APPLICATION

The present application claims priority wider 35 U.S.C. 119 from the Chinese patent application No. 201410260255.1, filed on Jun. 12, 2014 with the title of "Method for Preparing Fluorine/Nitrogen Co-doped Graphitized Carbon Microspheres with High Volumetric Specific Capacitance", the content of which is incorporated by reference herein in its entirety.

TECHNICAL FIELD

The present invention relates to a method for preparing an electrode material with high specific capacitance for an electrochemical capacitor.

BACKGROUND OF THE INVENTION

Electrochemical capacitors are a new type of energy storage devices emerged in recent years. They are characterized in having short charging time, long life time, good temperature characteristics, energy conservation and environment friendliness, etc. Comparing with traditional rechargeable batteries (Ni—H batteries and lithium ion batteries), electrochemical capacitors have a larger specific power of an order of above 1 kW/kg and a longer cycle life of over ten thousand cycles. Moreover, electrochemical capacitance is also an energy technology which does not lead to pollution of the environment. With the rise of new green electric vehicles and the development of a variety of electronic communication technologies, people are considering using electrochemical capacitors as a backup power for various storages and using them in combination with batteries to form a hybrid power system for electric vehicles. Accordingly, it is very important to conduct works in theoretical research and practical application of electrochemical capacitors. It is an important direction in future developments of electrochemical capacitors to synthesize electrode materials with nano-structures using nanotechnology, because nanomaterials or nanocomposites can effectively improve the electric capacity and cycle life of the materials due to their special nano-scale structures and morphologies.

In recent years, carbon nanomaterials such as carbon nanotubes, porous carbon, activated graphene, etc., have drawn great attentions as they can acquire a relatively high mass specific capacitance due to their high specific surface areas. However, these carbon materials with high specific surface areas may not be suitable as an electrode material for a supercapacitor, because their densities are usually less than 0.5 g $cm^{-3}$, resulting in their relatively low area specific capacitance and volumetric specific capacitance, whereas the volumetric specific capacity of a material is important due to the need for designing and manufacturing small-scale energy storage devices. Therefore, it is an important indicator for the electrode material to have a relatively high density.

Graphitized carbon microspheres have drawn broad attentions from researchers as advantages such as dense packing, good cycle performance and low price can be achieved due to their large bulk density. Graphitized carbon microspheres containing fluorine and nitrogen show a good application prospect in many fields, for example, new energy resources and the environmental pollution treatment, etc., due to their special compositions and microstructures. Qiu-Feng Lu, et al. (Journal of Analytical and Applied Pyrolysis, 2012, 93: 147-152) fabricates nitrogen-doped carbon hollow nanospheres by pyrolysis of copolymers, but the resulted material does not exhibit any electrochemical performance. Y. M. Yu, et al. (Fuel cells, 2012, 12:506-510) produces nitrogen-doped carbon hollow microspheres by using silicon dioxide as a template, carbonizing dopamine at different temperatures, and finally de-templating. This preparation method requires high temperature (1000° C.) treatment of the material, and the resulted material does not exhibit a good capacitive performance.

SUMMARY OF THE INVENTION

An object of the present invention is to provide a method for preparing fluorine/nitrogen co-doped graphitized carbon microspheres with high density, high degree of graphitization, and high volumetric specific capacitance in a simple synthesis process with moderate reaction conditions and high reproducibility. According to the present invention, fluorine/nitrogen co-doped graphitized carbon microspheres (hereinafter referred as "CM-NF") with high degree of sphericity and high volumetric specific capacitance are prepared mainly by a solvothermal process at a relatively low temperature using a specific surfactant as a structure directing agent without adding any metal catalyst.

The technical solutions of the present application are described as follows.

Raw materials used in the present invention mainly include a carbon source, a nitrogen source, a fluorine source and a surfactant. Among them, the carbon source may be any one selected from the group consisting of benzene, toluene, and xylene. The nitrogen source is a nitrogen-containing organic substance which may be any one selected from the group consisting of pyridine, ethylene diamine, pyrrole, acetonitrile, and aniline. The fluorine source may be any one selected from the group of consisting of ammonium fluoroborate, ammonium fluoride, and sodium fluoroborate. The surfactant may be cetyl trimethyl ammonium bromide (CTAB) or cetyl trimethyl ammonium chloride (CTAC). The amounts (in wt %) of the raw materials above are: 16%-82% of the carbon source, 13%-71% of the nitrogen source, 3%-17% of the fluorine source, and 1%-18% of the surfactant.

The preparation method according to the present invention is illustrated as follows.

1. Under a nitrogen atmosphere, the carbon source, the nitrogen source, the fluorine source and the surfactant, preferably being analytically pure, are successively added into a reactor, preferably in a charge amount of 60%-80%, and stirred for 10-30 min before the reactor is sealed.

2. The reactor from step 1 is placed into a crucible furnace, heated at a temperature of 300-600° C. for 6-48 hours, followed by naturally cooling to room temperature and removing the mixture therefrom.

3. The reaction mixture obtained from step 2 is washed successively with absolute ethanol, 0.1 M-5 M diluted hydrochloric acid, and distilled water for 3-6 times, and filtered. The powder thus obtained is placed into a vacuum oven and dried in vacuum at 60-100° C. for 6-12 hours, to give fluorine/nitrogen co-doped graphitized carbon microspheres with high degree of sphericity and high volumetric specific capacitance.

The present invention has the following advantages over the prior art.

1. Fluorine/nitrogen co-doped carbon microspheres with high degree of graphitization can be prepared at a relatively low temperature of 600° C., which avoids conventional high temperature conditions (>900° C.) in the synthesis of a carbon material with high degree of graphitization. Accordingly, the reaction conditions are moderate, and the preparation process is simple with high reproducibility and low costs, which enables large scale production and industrialization.

2. The fluorine/nitrogen co-doped graphitized carbon microspheres prepared according to the present invention have a high degree of sphericity and a high density, and exhibit good electrochemical properties in an alkaline environment. In addition, the doping of fluorine and nitrogen leads to enhanced electron transport capability as well as high volumetric specific capacitance and good cycle stability of the material.

3. No metal catalyst is required during the synthesis, which avoids the post-treatment steps for removing the metal catalyst, leading to simple operations and lower costs.

DETAILED DESCRIPTION OF THE INVENTION AND PREFERRED EMBODIMENTS

Example 1

In a glove box under a nitrogen atmosphere, 1 g of cetyl trimethyl ammonium chloride, 2.5 g of analytically pure ammonium fluoroborate, and 4 ml of ethylene diamine are added successively into 6 ml of toluene, and stirred for 10 min. The mixture is placed into a 15-ml stainless steel reactor and sealed. Then the reactor is placed into a crucible furnace, and heated at 300° C. for 6 hours. After the reactor is naturally cooled down to room temperature, the reaction mixture is removed therefrom, and washed successively with absolute ethanol, 0.1 M diluted hydrochloride acid and distilled water for 3 times, filtered, and then dried in vacuum at 60° C. for 12 hours, to obtain fluorine/nitrogen co-doped graphitized carbon microspheres with high volumetric specific capacitance.

Figure 1:
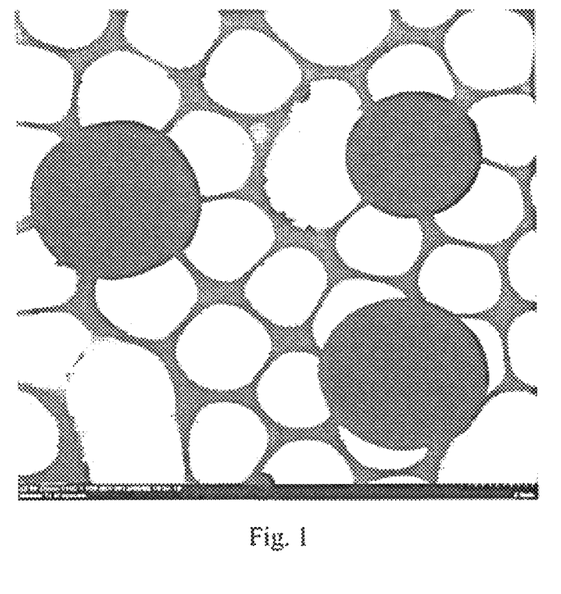
FIG. 1 is a transmission electron micrograph of the CM-NF prepared in Example 1 of the present invention.
Figure 2:
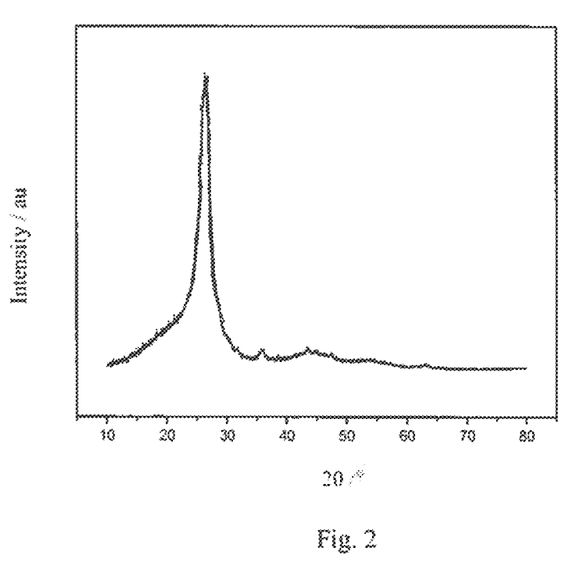
FIG. 2 is an X-ray diffraction pattern of the CM-NF prepared in Example 1 of the present invention.
Figure 3:
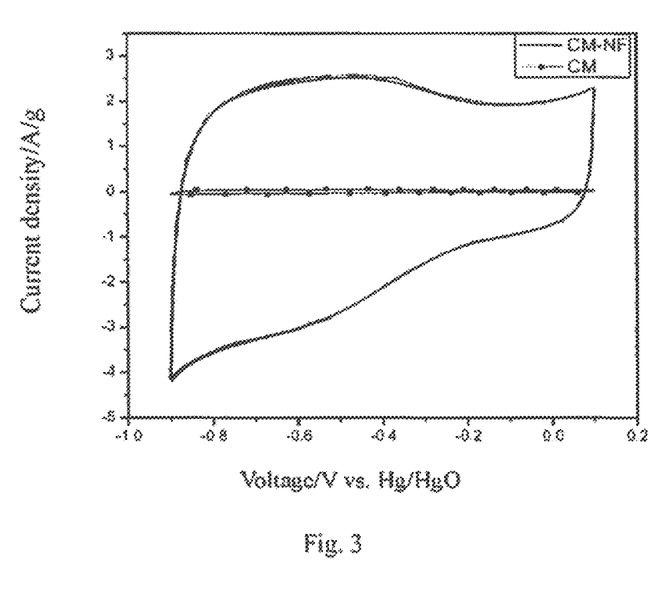
FIG. 3 shows a cyclic voltammetry curve of the CM-NF prepared in Example 1 of the present invention.

It can be seen clearly from FIG. 1 that the microspheres have a smooth surface and a high degree of sphericity, and a length of between 1 μm and 4 μm. A very strong diffraction peak at 26.02° and a minor diffraction peak at 43.23° can be seen from FIG. 2 which correspond to crystallographic planes (002) and (100) of the graphite carbon, respectively. This indicates that the synthesized fluorine/nitrogen co-doped graphitized carbon microspheres have a relatively good crystallinity and are in a form of hexagonal crystals. FIG. 3 shows a cyclic voltammetry curve of a capacitor comprising the fluorine and nitrogen doped graphitized carbon microspheres prepared according to the present invention as an electrode material obtained at a scanning speed of 10 mV/s. It can be seen from this figure that the cyclic voltammetry curve approximates a rectangle, indicating that the CM-NF is very stable in 6 M KOH electrolyte, which is characteristic for the behavior of an ideal capacitor. The volumetric specific capacitance is calculated as 286 $F/cm^{-3}$ by cyclic voltammetry.

Example 2

In a glove box under a nitrogen atmosphere, 1 g of cetyl trimethyl ammonium bromide, 2.1 g of analytically pure ammonium fluoride, and 9 ml of pyrrole are added successively into 6 ml of benzene, and stirred for 20 min. The mixture is placed into a 45-ml stainless steel reactor and sealed. Then the reactor is placed into a crucible furnace, and heated at 600° C. for 24 hours. After the reactor is naturally cooled down to room temperature, the reaction mixture is removed therefrom, and washed successively with absolute ethanol, 2 M diluted hydrochloride acid and distilled water for 5 times, filtered, and then dried in vacuum at 80° C. for 10 hours, to obtain fluorine/nitrogen co-doped graphitized carbon microspheres with high volumetric specific capacitance.

Figure 4:
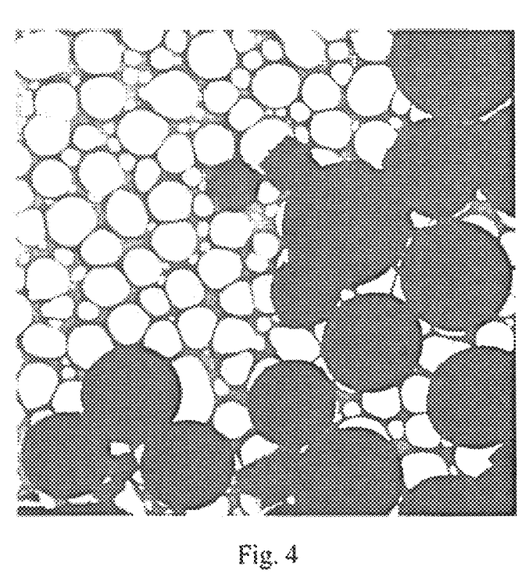
FIG. 4 is a transmission electron micrograph of the CM-NF prepared in Example 2 of the present invention.

It can be seen from FIG. 4 that the carbon microspheres have a good dispersity, and a smooth surface. They have a diameter of between 2 μm and 6 μm, and a high degree of sphericity.

Example 3

In a glove box under a nitrogen atmosphere, 1 g of cetyl trimethyl ammonium bromide, 2 g of analytically pure sodium fluoroborate, and 23.7 ml of acetonitrile are added successively into 4 ml of xylene, and stirred for 30 min. The mixture is placed into a 45-ml stainless steel reactor and sealed. Then the reactor is placed into a crucible furnace, and heated at 450° C. for 48 hours. After the reactor is naturally cooled down to room temperature, the reaction mixture is removed therefrom, and washed successively with absolute ethanol, 5 M diluted hydrochloride acid and distilled water for 6 times, filtered, and then dried in vacuum at 100° C. for 6 hours, to obtain fluorine/nitrogen co-doped graphitized carbon microspheres with high volumetric specific capacitance.

Figure 5:
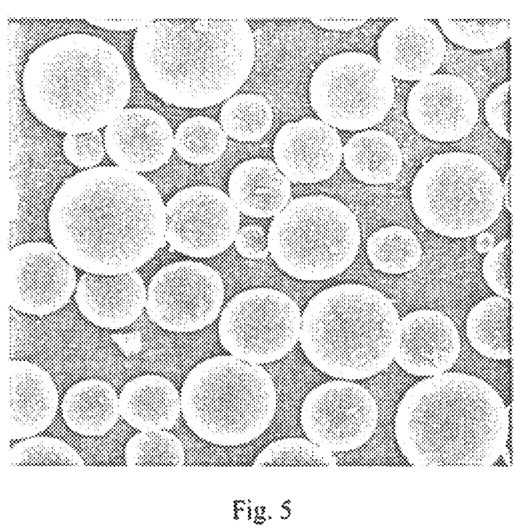
FIG. 5 is a transmission electron micrograph of the CM-NF prepared in Example 3 of the present invention.
Figure 6:
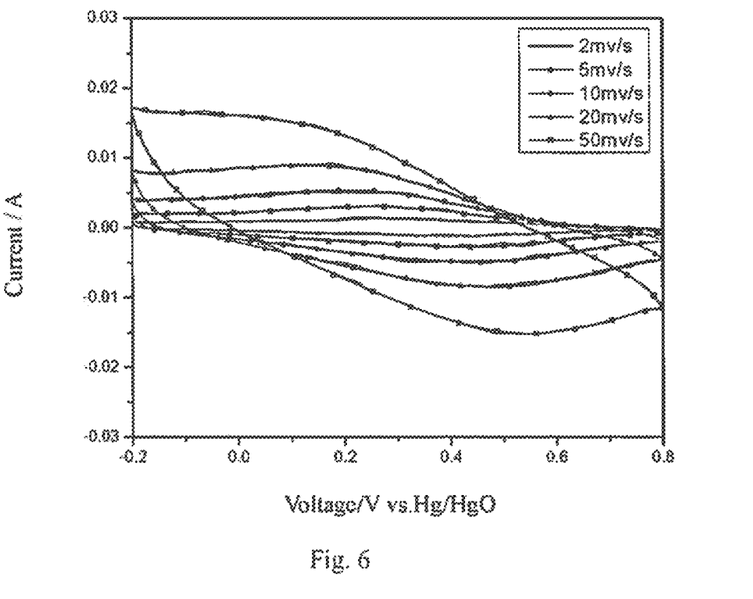
FIG. 6 shows cyclic voltammetric curves of the CM-NF prepared in Example 3 of the present invention in a 6 M KOH solution at different scanning speeds.

It can be seen from FIG. 5 that the carbon microspheres have a good dispersity, and a smooth surface. They have a diameter of between 2 μm and 6 μm, and a high degree of sphericity. FIG. 6 shows cyclic voltammetric curves of a capacitor comprising the CM-NF as an electrode material at scanning speeds of 2 mV/s, 5 mV/s, 10 mV/s, 20 mV/s, and 50 mV/s, respectively. The figure shows that the material exhibits a good rate capability at different scanning speeds.

Example 4

In a glove box under a nitrogen atmosphere, 1 g of cetyl trimethyl ammonium chloride, 1 g of analytically pure ammonium fluoride, and 15 ml of aniline are added successively to 15 ml of toluene, and stirred for 20 min. The mixture is placed into a 45-ml stainless steel reactor and sealed. Then the reactor is placed in a crucible furnace, and heated at 350° C. for 24 hours. After the reactor is naturally cooled down to room temperature, the reaction mixture is removed therefrom, and washed successively with absolute ethanol, 3 M diluted hydrochloride acid and distilled water for 5 times, filtered, and then dried in vacuum at 80° C. for 6 hours, to obtain fluorine/nitrogen co-doped graphitized carbon microspheres with high volumetric specific capacitance.

Figure 7:
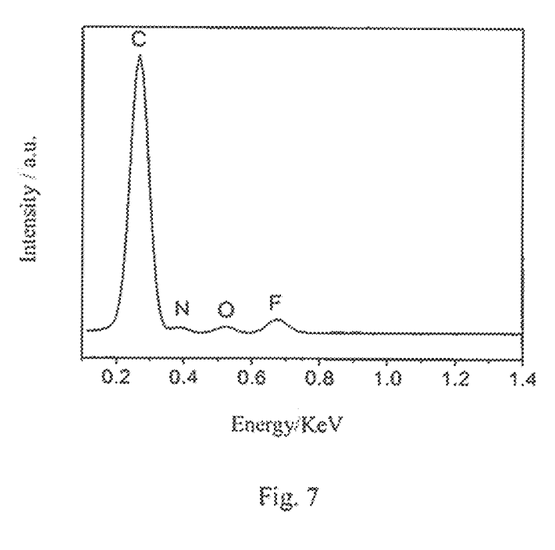
FIG. 7 is an X-ray energy spectrum of the CM-NF prepared in Example 4 of the present invention.
Figure 8:
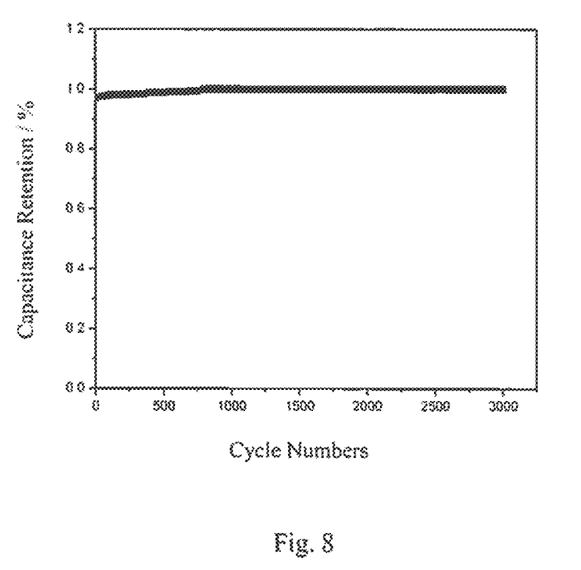
FIG. 8 shows the change in specific capacitance during the cyclic life of the CM-NF prepared in Example 4 of the present invention.

FIG. 7 is an X-ray energy spectrum of the carbon microspheres prepared according to the present invention. Based on the X-ray energy spectrum, the contents of the elements in the CM-NP can be calculated semi-quantitatively as follows: C: 83.39, N: 8.75, O: 3.36, and F: 4.5. (The X-ray energy spectrum can be used to semi-quantitatively analyze the element composition of a material.) FIG. 8 shows the change in the discharge capacity of the carbon microspheres prepared according to the present invention with the cycle numbers when constant-current charge/discharge is carried out on the capacitor at a current density of 5 A/g in a range of −0.2 to 0.8 V. The figure shows that the capacitor comprising the CM-NF as an electrode material has an excellent cycle performance, in which its capacitance shows almost no loss after 3000 charge/discharge cycles.

Example 5

In a glove box under a nitrogen atmosphere, 0.2 g of cetyl trimethyl ammonium bromide, 1 g of analytically pure sodium fluoroborate, and 10 ml of pyridine are added successively into 20 ml of xylene, and stirred for 30 min. The mixture is placed into a 45-ml stainless steel reactor and sealed. Then the reactor is placed into a crucible furnace, and heated at 420° C. for 28 hours. After the reactor is naturally cooled to room temperature, the reaction mixture is removed therefrom, and washed successively with absolute ethanol, 1 M diluted hydrochloride acid and distilled water for 5 times, filtered, and then dried in vacuum at 70° C. for 8 hours, to obtain fluorine/nitrogen co-doped graphitized carbon microspheres with high volumetric specific capacitance.

What is claimed is:

1. A method for preparing fluorine/nitrogen co-doped graphitized carbon microspheres, wherein:

16%-82% of a carbon source, 13%-71% of a nitrogen source, 3%-17% of a fluorine source, and 1%-18% of a surfactant, all in a mass percentage, are successively added to a reactor under a nitrogen atmosphere, and stirred for 10-30 minutes before the reactor is sealed;

the reactor is placed into a crucible furnace and heated at 300-600° C. for 6-48 hours, followed by naturally cooling the reactor to room temperature and removing the reaction mixture therefrom;

the resulted reaction mixture is washed successively with absolute ethanol, 0.1 M-5 M diluted hydrochloride acid and distilled water for 3-6 times, and filtered; and powder thus obtained is placed into a vacuum oven and dried in vacuum at 60-100° C. for 6-12 hours.

2. The method for preparing fluorine/nitrogen co-doped graphitized carbon microspheres according to claim 1, wherein the carbon source is any one selected from the group consisting of benzene, toluene, and xylene; the nitrogen source is a nitrogen-containing organic substance which is any one selected from the group consisting of pyridine, ethylene diamine, pyrrole, acetonitrile, and aniline; the fluorine source is any one selected from the group consisting of ammonium fluoroborate, ammonium fluoride, and sodium fluoroborate; and the surfactant is cetyl trimethyl ammonium bromide or cetyl trimethyl ammonium chloride.

3. The method for preparing fluorine/nitrogen co-doped graphitized carbon microspheres according to claim 2, wherein the surfactant is analytically pure.

4. The method for preparing fluorine/nitrogen co-doped graphitized carbon microspheres according to claim 3, wherein the carbon source, the nitrogen source, the fluorine source, and the surfactant are charged into the reactor in a charge amount of 60%-80% relative to total volume of the reactor.

* * * * *